(12) United States Patent
Downie

(10) Patent No.: US 6,216,761 B1
(45) Date of Patent: Apr. 17, 2001

(54) FREE TURNING CHILLING WHEEL ASSEMBLY

(75) Inventor: Peter M. Downie, Vancouver, WA (US)

(73) Assignee: Linear Products, Inc., Vancouver, WA (US)

( * ) Notice: Subject to any disclaimer, the term of this patent is extended or adjusted under 35 U.S.C. 154(b) by 0 days.

(21) Appl. No.: 09/273,027

(22) Filed: Mar. 19, 1999

(51) Int. Cl.[7] ..................................... F28F 5/02
(52) U.S. Cl. ..................... 156/498; 118/101; 156/578; 492/17; 492/46
(58) Field of Search ............................. 156/498, 578; 492/17, 46; 118/69, 101, 202; 165/89, 90; 100/336

(56) References Cited

U.S. PATENT DOCUMENTS

| 3,782,330 | 1/1974 | Kanda et al. . |
|---|---|---|
| 4,120,349 | 10/1978 | Alheid et al. . |
| 4,285,758 | 8/1981 | Clausen et al. . |
| 4,925,521 | 5/1990 | Asbury, Jr. et al. . |
| 4,955,433 | * 9/1990 | Zaoralek ................................. 165/89 |
| 4,964,202 | * 10/1990 | Pav et al. ............................. 100/336 |
| 5,174,206 | * 12/1992 | Molinatto ............................... 165/89 |
| 5,662,767 | 9/1997 | Getz et al. . |

* cited by examiner

Primary Examiner—Geoffrey L. Knable
(74) Attorney, Agent, or Firm—Nancy N. Quan

(57) ABSTRACT

A free turning chilling wheel assembly for use with a hot melt dispenser affording quick disassembly for cleaning, inspection, repair or replacement, and having an outer ring with an inner bronze bearing to rotate about a stationary inner cooling chamber, which is sealed to avoid wear and leaks. The outer ring is chilled by fluid flowing through the chamber and the sides of the outer ring are shielded by shielding washers to avoid adhesive building up on the bearing surfaces and ends.

20 Claims, 3 Drawing Sheets

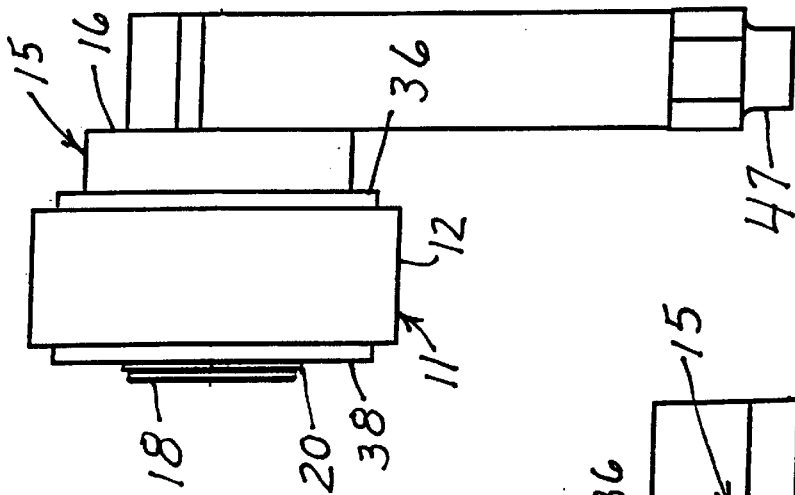
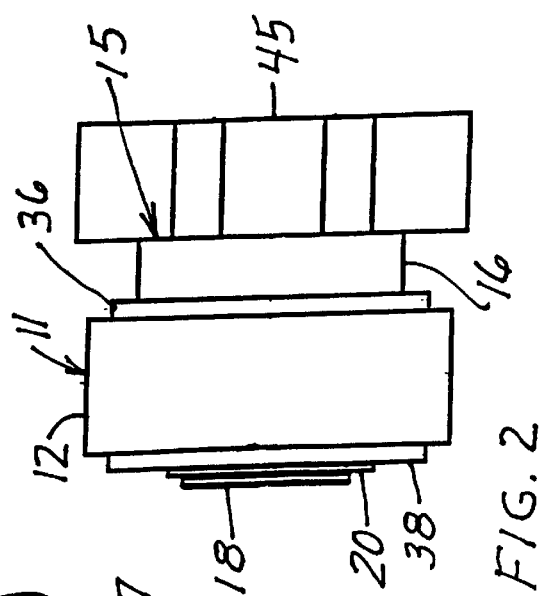
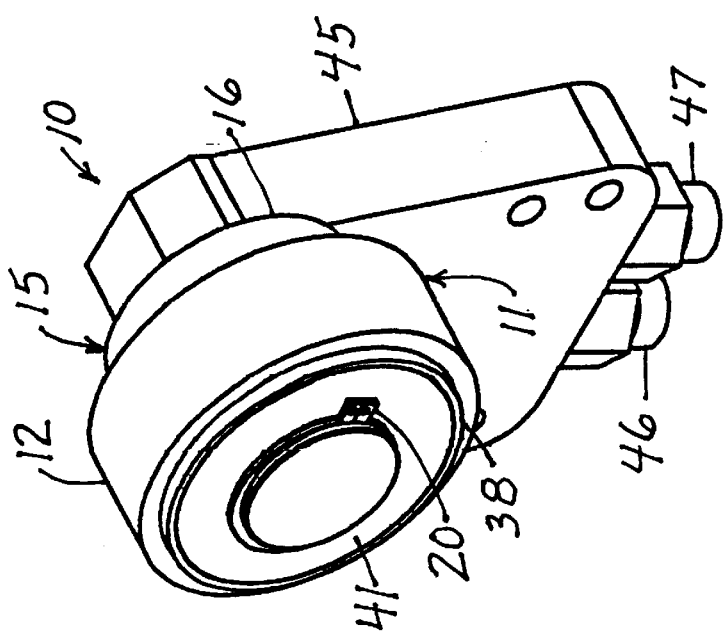

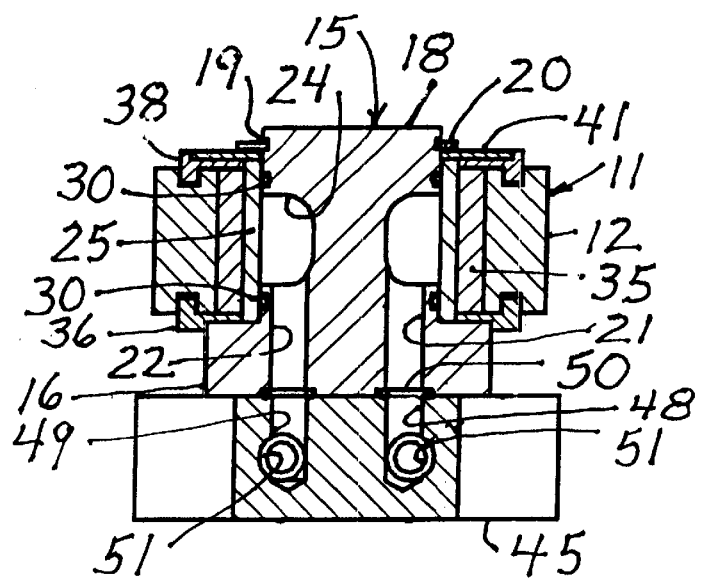

FREE TURNING CHILLING WHEEL ASSEMBLY

FIELD OF THE INVENTION

This invention relates to an improvement in the structure of a chill wheel. More particularly, the invention relates to an assembly which affords the circulation of chilled water against the inner part of an outer ring of the wheel assembly and an assembly which affords easy removal for cleaning, inspection, repair and replacement.

The present invention provides an improved cooling wheel to be used for applying a tape or string of tacky hot-melt adhesive to a substrate. In one aspect, the present invention is directed to a free turning ring assembly which is cooled by a chilled fluid running through a stationary chamber, chilling the outer ring to chill the molten or tacky adhesive and adhere it to the substrate. The cooling or chill wheel, as it is often called, normally follows a dispenser which heats and directs the tacky hot-melt tape or string to be applied toward the substrate.

DESCRIPTION OF THE PRIOR ART

The prior art includes examples of hot-melt adhesive applicators adapted to dispense a ribbon of hot melt adhesive tape or to dispense a string of hot melt adhesive toward a moving substrate, to apply the adhesive to the substrate. The hot melt adhesive is then pressed against the substrate by an applicating wheel intended to press the adhesive onto the substrate. Such an applicator is illustrated in U.S. Pat. No. 4,285,758 wherein the applicating wheel 75 provides means for cooling the bonded thermoplastic adhesive. The wheel 75 comprises a wheel or roller made of hard material such as steel.

The hub of the wheel could be cast from aluminum and be provided with a hardened steel tire, which could in turn be chrome-plated. The wheel 75 rotates about a shaft mounted to an auxiliary cooling assembly frame 77 which is pivotally mounted. The cooling is carried out by coating the wheel with a release agent liquid which is wicked onto the surface of the wheel. The wheel served to cool the adhesive completing the bond. When the thermoplastic stuck to the wheel a scraper blade maintained in contact with the cooling wheel was used to release the adhesive.

Another example of adhesive applicating wheels is illustrated in U.S. Pat. No. 4,925,521, wherein a band 100 extends about wheels 104 and 106 and is driven at the same speed as the conveyor 18 to press the tape strip 28 against the carton blank advanced by the conveyor 18. In this machine the band 100 is heated to heat the tape to its application temperature as it passes beneath the band 100 on top of the carton. Here the carton acts as the heat sink to help cool and solidify the tape after it leaves the bonding assembly. Here the wheels 104 and 106 are supported on shafts by roller bearings and while 106 is driven, roller 104 is the idler driven by the band 100.

A prior art applicating roller is disclosed in U.S. Pat. No. 5,662,767 and comprises a wheel 18 which rotates with supporting axle 68 and is mounted with bearings 70 at an end of the wheel support 20. The axle 68 defines an inlet conduit 72 for conducting fluid into a rotating wheel chamber 74 and an outlet conduit 76 for conducting fluid away from the wheel chamber. An inlet tube 78 is threadably attached to an inlet fitting 80 and provides a source of cooling fluid to the wheel chamber 74 through the inlet conduit 72. An outlet tube 82, threadably attached to an outlet fitting 84 and inlet fitting 80 prevents fluid from leaking from the system. The wheel is cooled internally by the cooling fluid, which preferably is recirculated in a closed system. Grooves are formed on each side of the wheel proximate the peripheral surface 90 of the wheel. An axle cover 92 on each end of the axle 68 extends from the inlet fitting 80 and outlet fitting 84 of the axle toward the peripheral surface 90. A tongue 94 projects from each axle cover 92 toward the wheel 18 and cooperatively engages the groove 88. The axle cover 92 thus defines a smooth sloping surface 96 extending from the tongue 94 proximate the wheel to the inlet fitting 80 or outlet fitting 84 on the axle 68. In the event the string 12 becomes dislodged from the application pathway the axle cover 92 prevents the string from winding onto the axle 68.

In this known prior art, sealed roller bearings are used in an environment where dust, heat and water are present causing the same to eventually become wet and dirty and become less effective due to an increase in drag on the wheel and most chill wheels are not driven. Further, known water cooled chill wheels use rotating water or chilling fluid reservoirs, resulting in greater danger of leaking.

The present invention eliminates sealed bearings, rotating cooling chambers and the tendency for the adhesive to wind on the rotating shaft of the chill wheel causing build up and interruption of the rotation.

SUMMARY OF THE INVENTION

The present invention is directed to an assembly for a chill wheel that will have less interruptions in its continued use by the elimination of sealed bearings, rotating chilling fluid reservoirs, and exposed rotating axles that allow adhesive build up. Elimination of sealed bearings also eliminates inherent drag due to friction caused by rotating sealed bearings.

A chill wheel assembly according to the present invention comprises a shaft having an inboard end and an extended end portion. The extended end portion has a section of reduced diameter between the inboard end and the distal end portion and has means for forming passageways through the inboard end affording communication between the space formed by the reduced section and the proximal end of the shaft for allowing chilling fluid to circulate through the reduced section. A cylindrical stator sleeve, having an outer cylindrical surface and an inner cylindrical surface, is placed over the end portion to cover the reduced section of the shaft for forming an enclosed chamber. An outer ring having an external cylindrical surface and an internal bore, with a bearing sleeve frictionally fitted within the internal bore fits closely over the stator sleeve. A sealing washer is placed against the inboard end of the shaft and the outer ring and another sealing ring is placed against the other end of the outer ring, and means are provided for retaining the second washer on the distal end to hold the parts together.

The chill wheel assembly for use on an adhesive applicator comprises a support member and a shaft is joined to the support member and extends therefrom in a cantilever fashion. The shaft has an inboard, proximal end or head, and an axially extending end portion. The end portion has a section of reduced diameter forming a cavity between the head of the shaft and the distal end portion and has passageways through the head affording communication between the reduced section and the proximal end of the shaft. A cylindrical stator sleeve is placed over the end portion to cover the section of reduced diameter, the cavity, and form a chamber. The chamber can be used for circulating water. A first sealing washer is positioned over the end portion and the stator sleeve and against the face of the head. An outer ring, having an external cylindrical surface and an internal bore, and a cylindrical bearing sleeve member fitted within the internal bore, having an internal diameter to fit closely about the outer surface of the stator sleeve, to provide rotation the of outer cooling ring or wheel. A second sealing washer is positioned over the distal end of the end portion, and there are retaining means on the distal end of the shaft to hold the assembly together.

BRIEF DESCRIPTION OF THE DRAWINGS

The present invention will be described with reference to the accompanying drawing wherein like reference numerals in the several views refer to like parts and wherein:

FIG. 1 is a perspective view of the chill wheel assembly incorporating one form of the present invention;

FIG. 2 is a top plan view of the assembly of FIG. 1;

FIG. 3 is a side elevational view of a chill wheel assembly according to the present invention;

FIG. 4 is a back view, with broken lines to show hidden features;

FIG. 5 is a sectional view taken along line 5—5 of FIG. 4; and

DESCRIPTION OF THE PREFERRED EMBODIMENTS

Figure 6:
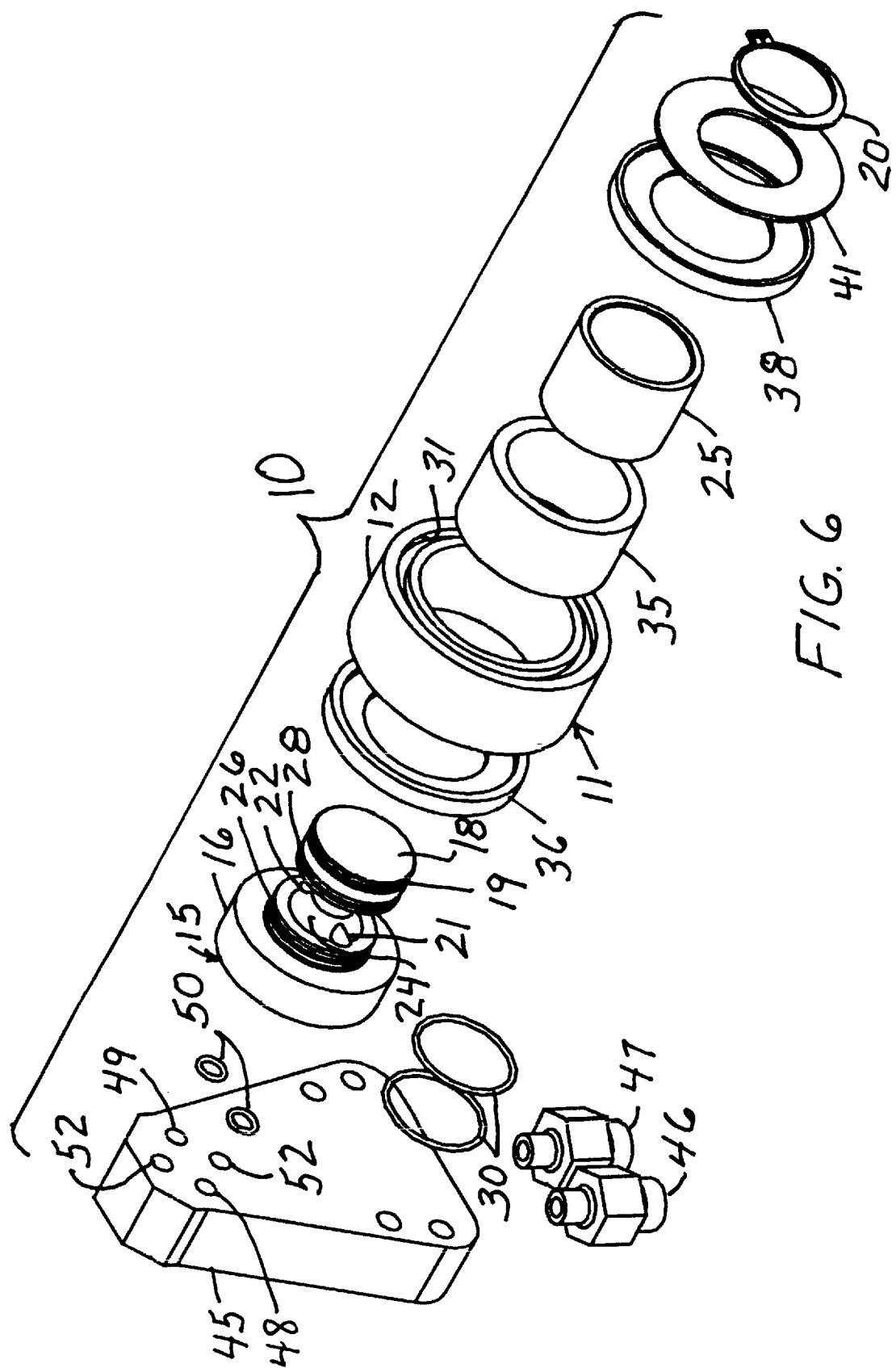
FIG. 6 is an exploded view of the assembly showing the various parts of the illustrated assembly.

The present invention provides an improved chill wheel assembly for use with adhesive dispensing and application equipment. The chill wheel assembly is used to press and apply the adhesive to a substrate. The adhesive is a hot melt adhesive tape or string of adhesive that has been heated before it is dispensed toward a substrate such as a plywood panel or carton material for example. The chill wheel is placed closely adjacent to the area where the adhesive meets the substrate to press the adhesive into contact with the substrate and to cool the adhesive contacting the chill wheel to maintain separation of the surface of the wheel from the adhesive so it bonds to the substrate. Preferably the chill wheel is placed downstream.

The chill wheel assembly 10 of the present invention comprises an outer ring member 11 having a cylindrical outer surface 12 for contacting the adhesive and substrate, which ring 11 is rotatably mounted on a shaft 15. The shaft 15 is generally cantilever mounted and has a head 16 at the or inboard end and an outwardly projecting cantilevered shaft end portion 18. In the illustrated example the head 16 is circular and has a given diameter. The head 16 could be square in axial cross section or have other shapes. The end extended portion 18 projects axially from a face on the head. The end portion 18 has a peripheral groove 19 adjacent to the distal end of the end portion 18 to receive a retainer clip 20, which forms the retaining means for holding the assembly together. Spring clip 20 is the fastener which is expanded or opened and placed over the distal end and into the groove 19. Alternative retaining means could be a thread and nut, hole and cotter pin or similar structure. The spring clip 20 takes up the least space.

The shaft member 15 has a pair of bores 21 and 22 forming passageways, see FIG. 5 and 6, extending therethrough and communicating with an area of reduced diameter along the shaft, formed by a deep peripheral groove 24 in the end portion 18 between the proximal end the distal end thereof, which groove 24 forms a chamber for the circulation of the chilling fluid. The groove 24 has curved surfaces to promote circulation within the area as will be shown later. Fluid is directed under pressure into one of the passageways 21, 22 and it flows around the chamber 24 and out the other passageway. The groove 24 is enclosed by a stator sleeve 25 which fits over the end portion 18 defining the enclosed chamber. Additional peripheral grooves 26 and 28 are formed in the end portion 18, the first 26, adjacent to the head 16 of the shaft 15 and the second 28 across the groove 24 from the first 26. O-rings 30 are placed in the grooves 26 and 28 and are engaged by the stator sleeve 25 and cooperate with the stator sleeve 25 to form a fluid tight chilling chamber. The chamber can be used for circulating fluid such as water. The stator sleeve 25 and shaft 15 are formed of a material to avoid corrosion such as stainless steel, because they form part of the chilling chamber through which the chilling medium is pumped.

The outer ring 11 illustrated has a diameter of 2.75 inches (about 7 cm), a length of about 1 inches (2.54 cm) and a thickness of about 0.85 to 0.9 inch (2.16 to 2.3 cm) and is formed with one eighth inch deep (0.3 cm) continuous circumferential grooves 31 in the opposite axial ends. A cylindrical bearing sleeve member 35, formed of bronze or a similar bearing material, is frictionally fit within the ring 11 and has an inner diameter to closely fit about the stator sleeve 25 to rotatably support the outer ring 11. The two members 25 and 35 have varying outer and inner diameters respectfully within four or 5 thousandths (0.004 to 0.005 of an inch) (0.01 to 0.012 cm) to afford the relative free rotation between them with the relatively low amount of force placed against the outer surface 12 of the ring 11 by the substrate and adhesive. The outer ring 11 is formed of a metal with an electroless nickel plate. The outer ring 11 may be formed of a ceramic with a bronze sleeve. The shaft 15, stator sleeve 25, bearing sleeve and outer ring 11 should be formed of materials with good thermal conductivity.

Positioned adjacent to the inboard side and the outer side of the outer ring 11 are sealing washers 36 and 38. As more clearly shown in FIGS. 5 and 6, the cross section of the sealing washers 36 and 38 are generally "T shaped" such that one axially extending flange of each washer 36, 38 fits in a groove 31 of the outer ring 11. The hole in the center of the washers fits over the stator sleeve 25. The sealing washer shield the rotary parts from contamination by the adhesive. Within the flange on the opposite sides of the sealing washers 36, 38 there is an axial recess to receive the head 16 of the shaft 15 and on the distal end a washer 41. The washers 36, 38 are formed of a low coefficient of friction material but one which is stable and oliophobic, such as nylon or other plastic material.

The washers 36 and 38 may rotate freely on the stator sleeve or stationary sleeve 25 and the flanges on the washers that fit in the concentric grooves 31 on the outer ring 11 are shorter than the depth of the grooves and they have radial dimension that is less than the radial dimension of the groove 31. The outer ring 11 can rotate free from engagement with the washers 36 and 38 or the washers can rotate freely with the outer ring if the outer ring contacts either washer. In this way, the washers 36 and 38 serve to cover or shield the outer ring 11 and bearing sleeve 35 where they rotate on the stator sleeve 25 from contamination by the adhesive.

The washer 41 on the other hand is formed of steel which may or may not be plated or equivalent, and fits against the retainer clip 20 of the wheel assembly 10.

In the drawing the wheel assembly 10 is supported from a manifold 45 having fluid transmitting bores 51 formed therein connected at one end to traverse bores 48 and 49 and at the exterior to water line fittings 46 and 47, see FIG. 4. The inboard end of the shaft member 15 is sealed against the manifold 45. Counter bores are formed on the face of shaft 15 about the axially parallel bores 21 and 22 to receive two small O-rings 50. These two small O-rings 50 seal the transverse bores 48 and 49 in the manifold 45 and the axially parallel bores 21 and 22 of the shaft member 15 to define good seals about the bores defining the chilling fluid passageways. The manifold 45 is preferably formed of aluminum or similar material. The material should permit changes in temperature without disturbing the O-ring seals 50.

The manifold 45 is illustrated as one type of support member for the shaft 15. The manifold can also have different shapes. Alternatively, the support member for the shaft supporting the freely rotating outer ring may be an arm. Such an arm may be secured to the head of the shaft. This could include an extension to the head extending away from the extended end portion 18, and threading this extension to receive, a first insulating washer, the support arm, another insulating washer, a steel washer and a threaded locking nut. The locking nut serving to hold the head on the arm. The insulating washers serving to block heat from the adhesive dispensing device, to which the arm is connected, from reaching the chilling wheel, or outer ring 11. In assemblies such as this the fittings 45, 47 for the chilling fluid would be connected directly to the head and to outboard ends of the bores 21 and 22.

The manifold 45 is joined to the face of the shaft 15 at the proximal end by bolts (not shown), or other fasteners, extending through openings 52 in the manifold 45 and into the face of the head 16 of the shaft member 15.

Having described the invention with reference to the accompanying drawing, it is contemplated that changes can be made in shape, size and materials without departing from the spirit or scope of the invention as set forth in the appended claims.

What is claimed is:

1. A chill wheel assembly for use on an adhesive applicator comprising:
    a) a shaft having an inboard end with a face, and an extended end portion extending from said face and having a proximal end at said face and a distal end, said extended end portion having a section of reduced diameter between the proximal end and the distal end portion and having means for forming passageways through the inboard end affording communication between the space formed by the reduced section and the proximal end of said shaft;
    b) a first washer positioned over the extended end portion and against said face of said inboard end;
    c) a cylindrical stator sleeve, having an outer cylindrical surface and an inner cylindrical surface, placed over said extended end portion to cover said reduced section of said extended end portion for forming a chamber;
    d) an outer ring having an external cylindrical surface and an internal bore,
    e) a cylindrical member fitted within said internal bore having an internal diameter placed to fit closely about the outer surface of said stator sleeve an rotatably support said outer ring;
    f) a second washer positioned over said distal end of said extended end portion and against said outer ring; and
    g) means for retaining said second washer on said distal end.

2. A chill wheel assembly according to claim 1, wherein means are provided for sealing the stator sleeve about said extended portion.

3. A chill wheel assembly according to claim 1, wherein said bearing member is formed of a bronze material.

4. A chill wheel assembly according to claim 1, wherein O-rings are positioned about said extended end portion and are engaged by said stator sleeve to seal the reduced section and tightly seal said chamber.

5. A chill wheel assembly according to claim 3, wherein O-rings are positioned about said extended end portion and are engaged by said stator sleeve to seal the reduced section and tightly seal said chamber.

6. A chill wheel assembly according to claim 1, wherein said outer ring has concentric grooves on opposite ends and said first and second washers have axially extending flanges fitting within said concentric grooves to shield the ends of said outer ring and bearing sleeve.

7. A chill wheel assembly according to claim 6, wherein said first and second washers are formed of low coefficient of friction material.

8. A chill wheel assembly according to claim 6, wherein said first and second washers are formed of nylon.

9. A chill wheel assembly according to claim 6, wherein O-ring means seal said stator sleeve against said extended end portion affording a sealed chamber at each end of said reduced section.

10. A free turning chill wheel for use with a hot melt dispensing apparatus V comprising:
    a) a support member;
    b) a shaft joined to the support member and extending therefrom in a cantilever fashion, said shaft having an inboard end of a given diameter and an axially extending end portion of a lesser diameter and greater axial dimension;
    c) a steel sleeve placed over said end portion;
    d) a first washer positioned over the end portion and steel sleeve and against said inboard end;
    e) an outer ring having an external cylindrical surface and an internal bore;
    f) a bearing sleeve fitted within said internal bore having an internal diameter to fit closely and rotatably about the outer surface of said steel sleeve; and
    g) a second washer positioned over said distal end of said end portion, and retaining means for retaining said second washer on said end portion.

11. A chill wheel assembly according to claim 10, wherein means are provided for sealing the stator sleeve about said extending end portion.

12. A chill wheel assembly according to claim 11, wherein said means for sealing the stator sleeve are O-rings positioned about said extending end portion and are engaged by said stator sleeve to seal the reduced section and form a chilling chamber.

13. A chill wheel according to claim 10, wherein said retaining means comprises a retaining washer and a retaining ring fitting in a peripheral groove about the distal end of said shaft.

14. A chill wheel assembly for use on an adhesive applicator comprising:
    a) a support;
    b) a shaft supported by said support, said shaft having an inboard end of a given diameter and an axially extending end portion of less diameter and greater axial dimension with a proximal end and a distal end, said end portion also having a section of reduced diameter between the proximal end and the distal end and having cooling passage means for communicating between the space formed by the reduced section and the proximal end of said shaft;

c) a cylindrical stator sleeve placed over said extending end portion to cover said space formed by said reduced section of the shaft and the ends of said passage means d) a first washer positioned over the extending end portion and against a face at said proximal end;

e) an outer ring having an external cylindrical surface and an internal bore, a bearing sleeve fitted within said internal bore having an internal diameter fitted-closely and rotatable about the outer surface of said stator sleeve;

f) a second washer positioned over said distal end of said extending end portion; and g) retaining ring means for retaining said second washer on said extending end portion of said shaft.

15. A chill wheel assembly according to claim 14, wherein said bearing sleeve is formed of a bronze material.

16. A chill wheel assembly according to claim 14, wherein said outer ring has concentric grooves formed in opposite ends and said first and second washers have flange means fitting into said concentric grooves for covering the ends of said outer ring and bearing sleeve.

17. A chill wheel assembly according to claim 16, wherein said first and second washers are formed of low coefficient of friction material.

18. A chill wheel assembly according to claim 17, wherein said first and second washers are formed of nylon.

19. A chill wheel assembly according to claim 16, wherein O-rings seal the ends of said stator sleeve against said extending end portion affording a closed chilling fluid chamber at said reduced section.

20. A chill wheel according to claim 16, wherein a retaining washer is placed against said second washer.

* * * * *

UNITED STATES PATENT AND TRADEMARK OFFICE
CERTIFICATE OF CORRECTION

PATENT NO.    : 6,216,761 B1                                              Page 1 of 1
DATED         : April 17, 2001
INVENTOR(S)   : Peter M. Downie It is certified that error appears in the above-identified patent and that said Letters Patent is hereby corrected as shown below:

Column 3,
Line 6, "the of" should be -- of the --.
Line 49, "the or inboard" should be -- the inboard --.
Lines 52-53, "The end extended portion" should be -- The extended end portion --.
Line 66, "proximal end the distal" should be -- proximal end and the distal --.

Column 5,
Line 58, "bore," should be -- bore; --.
Line 59, "cylindrical member" should be -- cylindrical bearing member --.
Line 61, "sleeve an rotatably" should be -- sleeve and rotatably --.

Column 6,
Line 29, "apparatus V comprising" should be -- apparatus comprising --.

Column 7,
Line 7, "means" should be -- means; --.
Line 12, "fitted-closely" should be -- fitted closely --.
Line 13, "rotatable" should be -- rotatably --.

Signed and Sealed this

Eleventh Day of March, 2003

JAMES E. ROGAN
*Director of the United States Patent and Trademark Office*